US012599933B2

(12) United States Patent
McKiver

(10) Patent No.: US 12,599,933 B2
(45) Date of Patent: Apr. 14, 2026

(54) MATERIAL SORTING APPARATUS

(71) Applicant: KIVERCO LIMITED, Dungannon (GB)

(72) Inventor: Aidan McKiver, Dungannon (GB)

(73) Assignee: Kiverco Limited, Dungannon Tyrone (GB)

(*) Notice: Subject to any disclaimer, the term of this patent is extended or adjusted under 35 U.S.C. 154(b) by 169 days.

(21) Appl. No.: 18/253,860

(22) PCT Filed: Nov. 22, 2021

(86) PCT No.: PCT/EP2021/082562
§ 371 (c)(1),
(2) Date: May 22, 2023

(87) PCT Pub. No.: WO2022/106706
PCT Pub. Date: May 27, 2022

(65) Prior Publication Data

US 2024/0100567 A1 Mar. 28, 2024

(30) Foreign Application Priority Data

Nov. 20, 2020 (GB) ..................................... 2018299

(51) Int. Cl.
*B07B 1/00* (2006.01)
*B03B 9/06* (2006.01)
(Continued)

(52) U.S. Cl.
CPC ................ *B07B 1/005* (2013.01); *B03B 9/06* (2013.01); *B07B 1/22* (2013.01); *B07B 4/08* (2013.01)

(58) Field of Classification Search
CPC .. B07B 1/005; B07B 1/22; B07B 4/08; B03B 9/06
(Continued)

(56) References Cited

U.S. PATENT DOCUMENTS 5,116,486 A * 5/1992 Pederson ................ B03B 9/061 209/702
5,339,961 A 8/1994 Mayhak
(Continued)

FOREIGN PATENT DOCUMENTS

CA 2996379 A1 * 8/2018 ............ B65F 1/1426
CN 110142124 A * 8/2019 ............... B07B 1/22
(Continued)

OTHER PUBLICATIONS

International Search Report and Written Opinion for corresponding International Application PCT/EP2021/082562 dated Feb. 28, 2022 (12 pp).

*Primary Examiner* — Terrell H Matthews
(74) *Attorney, Agent, or Firm* — Renner, Kenner; Arthur M. Reginelli

(57) ABSTRACT

A material sorting apparatus 100 for sorting materials in a material stream comprises: a material intake means 102 for receiving material that is input to the material sorting apparatus 100; at least one screening means 103 located downstream of the material intake means 102; at least one material separation means 104-106 located downstream of the material intake means 102; at least one conveyor means 107 for conveying material along a path within, around and/or proximal to the material sorting apparatus; and an elongate support means 101 adapted for supporting the material intake means 102, the at least one screening means 103, the at least one material separation means 104-106 and the at least one conveyor means 107.

18 Claims, 3 Drawing Sheets

(51) Int. Cl.
*B07B 1/22* (2006.01)
*B07B 4/08* (2006.01)

(58) Field of Classification Search
USPC .......................................................... 209/233
See application file for complete search history.

(56) References Cited

U.S. PATENT DOCUMENTS

| | | | | |
|---|---|---|---|---|
| 6,382,425 | B1 * | 5/2002 | Brickner | B07B 1/15 209/672 |
| 2014/0077007 | A1 | 3/2014 | Sommer, Jr. et al. | |
| 2019/0255572 | A1 | 8/2019 | Nilson | |

FOREIGN PATENT DOCUMENTS

| | | | | | |
|---|---|---|---|---|---|
| CN | 110369262 | A | * | 10/2019 | B08B 15/007 |
| DE | 4342850 | A1 | * | 6/1995 | B09B 3/32 |
| DE | 4401352 | A1 | | 7/1995 | |
| GB | 2550369 | A | * | 11/2017 | B07B 4/08 |
| GB | 2609042 | A | * | 1/2023 | B07B 13/16 |

* cited by examiner

MATERIAL SORTING APPARATUS

The present invention relates to a material sorting apparatus, particularly for separating material such as waste material into streams for recycling.

Many countries around the world are rapidly running out of landfill space. As such, it is becoming increasingly important to reduce our reliance on landfill sites. Finding ways to divert waste from landfills is beneficial as it removes the emissions caused by transporting the material as well as the costs associated with burying waste. While some countries have resorted to large-scale incineration of waste material, recycling is far preferable from an environmental standpoint. Waste streams typically include multiple categories of material such as fines, soil, plastics, aggregates and metal, many of which can be effectively used in new products. However, before recycling can take place these different categories of material must be separated and sorted. This can prove difficult and time-consuming.

When sorting large-volume waste streams it is common to use immobile purpose-built material sorting installations. Such installations of the known type comprise a plurality of stand alone sorting stations connected via conveyors. Because these systems have a large footprint and because they are complicated and time-consuming to set up, they are often permanently installed within waste facility buildings. This can prove to be inefficient in cases where waste material is generated far away from the waste facility, meaning that material will need to be transported long distances for sorting, increasing costs. After sorting, at least some of the sorted material may need also to be transported back to a site, increasing costs further. In addition to these economic costs, the repeated transport of material back and forth between sites will have a negative impact on the environment due to increased emissions from the vehicles used to transport said pre-sorted and post-sorted materials.

It is an object of the invention to obviate or mitigate the problems outlined above.

In particular, it is an object of the invention to reduce carbon emissions associated with transport and handling of materials.

It is a further object of the invention to create a material sorting apparatus which can be easily transported to and/or from a site.

It is a further object of the invention to provide a material sorting apparatus which can be easily installed at a site.

It is a further object of the invention to provide a material sorting apparatus which can be easily removed from a site.

It is a further object of the invention to provide a material sorting apparatus which can be used to sort various types of material in a material stream.

It is a further object of the invention to provide a material sorting apparatus which can be used to sort material in an industrial or domestic material stream.

According to a first aspect of the invention there is provided a material sorting apparatus for sorting materials in a material stream, the material sorting apparatus comprising: a material intake means for receiving material that is input to the material sorting apparatus; at least one screening means located downstream of the material intake means; at least one material separation means located downstream of the material intake means; at least one conveyor means for conveying material along a path within, around and/or proximal to the material sorting apparatus; and an elongate support means adapted for supporting the material intake means, the at least one screening means, the at least one material separation means and the at least one conveyor means. Advantageously, supporting the plurality of components on an elongate support means allows the components of the material sorting apparatus to be transported to site in a single operation, and removes or reduces the need to re-configure the apparatus for use when it reaches a site. Further advantageously, the support means allows the components of the material sorting apparatus to be removed from a site in a single operation, reducing the amount of time and effort required when material sorting activities on a site have been completed.

Optionally the material sorting apparatus is a waste sorting apparatus. As will be appreciated, the present invention is not limited to waste sorting only and can be employed in many diverse situations where streams of mixed material are to be separated and sorted.

Optionally the material sorting apparatus is an apparatus for separating materials in a waste stream.

Preferably the material sorting apparatus is locatable on, above and/or adjacent to one or more storage means in use.

Preferably the material supporting apparatus is located on, above and/or adjacent to one or more storage means in use.

Preferably the material sorting apparatus is semi-mobile.

Preferably the support means is locatable on, above and/or adjacent to one or more storage means in use.

Preferably sorted material is able to pass out of the material sorting apparatus and into the one or more storage means.

Preferably the support means comprises a single elongate chassis.

Preferably the support means comprises a single elongate non-motive chassis.

Preferably the chassis being non-motive means that the chassis itself does not include means to provide or allow movement, such as wheels or tracks.

Preferably the chassis being non-motive means that the chassis itself is non-wheeled and non-tracked.

Optionally the support means comprises one or more wheels and/or tracks.

Preferably the support means is a unitary component. By 'unitary component' it is meant that the support means forms a single structural unit.

Preferably the material sorting apparatus is transportable.

Preferably the material sorting apparatus is transportable via lifting.

Preferably the material sorting apparatus is liftable via a lifting means such as a crane.

Preferably the material sorting apparatus is liftable via a lifting means which is coupled to the support means.

Preferably the material sorting apparatus is transportable via a transport means such as a vehicle, particularly a heavy goods vehicle, truck, crane or lorry.

Preferably the material sorting apparatus is not integral with or permanently attached to a transport means such as a vehicle particularly a heavy goods vehicle, truck, crane or lorry.

Preferably the material sorting apparatus does not include wheel arrangements such as wheels or integrally-formed wheel supports.

Preferably the material sorting apparatus has a single configuration for transport and for use.

Preferably the configuration of the material intake means, the screening means, the at least one material separation means, and the support means during transport is the same as the configuration of the material intake means, the at least one material separation means, and the support means during use.

Preferably the material intake means, the screening means, the at least one material separation means, and the support means are in fixed locations with respect to each other in transport and in use.

Preferably the material intake means, the screening means, the at least one material separation means, and the support means are fixed with respect to each other in a single configuration in transport and in use.

Preferably the material sorting apparatus is locatable on one or more storage means.

Preferably the material sorting apparatus is locatable on one or more walls.

Preferably the material sorting apparatus is locatable on one or more bays or silos.

Preferably the one or more storage means comprises one or more silos formed by one or more walls.

Preferably the support means is located on the one or more walls.

Preferably the support means is located on the one or more walls, in use.

Preferably the material intake means comprises an entrance means for receiving material, particularly waste stream material or any other type of material to be sorted.

Preferably the material intake means comprises an outlet means for allowing material, particularly waste stream material or any other type of material to be sorted, to move out of the material intake means.

Preferably the outlet means is adapted to allow material, particularly waste material or any other type of material to be sorted, to move towards the at least one material separation means.

Preferably the outlet means is adapted to allow material, particularly waste material or any other type of material to be sorted, to pass into at least one of the material separation means.

Preferably the material intake means comprises a feed conveyor.

Preferably the material intake means comprises an inclined feed conveyor.

Preferably the feed conveyor is adapted to transport material in the material intake means towards the outlet means.

Preferably the feed conveyor is adapted to transport material in the material intake means out of the material intake means.

Preferably the feed conveyor is adapted to transport material in the material intake means towards the at least one material separation means.

Preferably the material intake means is mounted on the support means.

Preferably the material intake means is mounted on a first side of the support means.

Preferably the material intake means is mounted on an upper side of the support means.

Preferably the material intake means is located above the support means, in use.

Optionally the material intake means is not located above a storage means, in use.

Preferably the material intake means is mechanically coupled to the support means.

Preferably the material intake means is mounted on the support means via a mounting means.

Preferably the material intake means is rigidly attached or fixed to the support means.

Preferably the mounting means is rigidly attached or fixed to the material intake means and/or the support means.

Preferably the mounting means comprises one or more pillars that are rigidly attached or fixed to the material intake means and/or the support means.

Preferably one or more rigid attachments or fixings are provided by attachment means such as welded joints, rivets and/or nuts and bolts.

Preferably the at least one material separation means comprises at least one mechanical separation means. Advantageously the mechanical separation means allows material in the material stream to be physically manipulated i.e. pulled, pushed or floated from the material stream during operation.

Preferably the at least one material separation means comprises a plurality of material separation means.

Preferably the material transport means comprises one or more conveyor means.

Preferably the or each conveyor means is adapted to convey material between and/or within one or more of the material separation means.

Preferably the or each conveyor means is adapted to convey material towards and/or away from one or more of the material separation means.

Preferably the screening means comprises a trommel, screen box, disc screen, helical screen, ballistic separator, star screen, flip flow screen or flotation.

Preferably the screening means comprises a trommel.

Preferably the at least one material separation means comprises at least one screening means such as a trammel, screen box, disc screen, helical screen, ballistic separator, star screen, flip flow screen or flotation.

Preferably the at least one material separation means comprises a trommel that is adapted to produce different sizes of material.

Preferably the trommel is adapted to separate multiple sizes of material from the material stream.

Preferably the material separation means is a multi-screen material separation means.

Preferably the material separation means comprises multiple screens of different sizes.

Preferably the at least one screening means is located downstream from the material intake means.

Preferably the at least one screening means is located proximally to the material intake means.

Preferably the at least one screening means is adjacent to the material intake means.

Preferably the screening means is located such that material passing out of the material intake means passes into the screening means.

Preferably the at least one screening means is located upstream from one or more further material separation means.

Preferably the at least one screening means is adapted to separate undersized material or fines from the material stream.

Preferably the screening means comprises a screening means entrance.

Preferably, in use, the material stream is able to pass into the screening means via the screening means entrance.

Preferably the screening means comprises a primary screening means outlet for undersized material and/or fines.

Preferably, in use, undersized material or fines pass through the primary outlet and into a storage means.

Preferably the screening means comprises a secondary screening means outlet for the remaining material stream.

Preferably, in use, the material stream is able to pass out of the screening means via the secondary screening means outlet.

Preferably, in use, the material stream which passes out of the screening means via the screening means outlet is the remaining material stream after undersize material and/or fines and/or mid-size material have been removed therefrom.

Preferably the screening means is mounted on the support means.

Preferably the screening means is mounted directly on the support means.

Preferably the screening means is mounted on an upper side of the support means.

Preferably the screening means is mechanically coupled to an upper side of the support means.

Preferably the screening means is mechanically coupled to an upper side of the support means via suspension means such as one or more springs.

Optionally the screening means is rigidly attached to an upper side of the support means.

Preferably the screening means comprises a housing.

Preferably the screening means housing is mounted on the support means.

Optionally the screening means housing is mechanically coupled to an upper side of the support means.

Optionally the screening means housing is rigidly coupled to an upper side of the support means.

Preferably the screening means housing is mechanically coupled to an upper side of the support means via suspension means such as one or more springs.

Preferably the at least one material separation means comprises at least one air separator means.

Preferably the air separator means comprises an air-flow generation means.

Optionally the air separator means comprises a cyclonic separator.

Preferably the air-flow generation means comprises a fan or blower.

Optionally the air-flow generation means comprises a vacuum source for sucking material.

Preferably the air separator means is adapted to generate a flow of air proximally to the secondary screening means output.

Preferably the air separator means is adapted to generate a flow of air towards material in the material stream.

Preferably the air separator means is adapted to generate a flow of air towards or away from material in the material stream as said material passes out of the screening means.

Preferably the air separator means is adapted to generate a flow of air towards or away from material in the material stream as said material falls out of the screening means.

Preferably the air separator means is adapted to generate a flow of air towards or away from material in the material stream as said material passes out of the secondary screening means outlet.

Preferably the air separator means is adapted to separate low density/lighter material from other materials in a material stream.

Preferably the flow of air generated by the air separator means is operable to separate low density/lighter material from other materials in the material stream.

Preferably the flow of air generated by the air separator means is operable to direct low density/lighter material in the material stream towards a storage means.

Preferably the flow of air generated by the air separator means is operable to direct low density/lighter material in the material stream towards a storage means via a chute.

Preferably the storage means is a skip.

Preferably the gap between the chute and the skip is surrounded by a net

Optionally the storage means is a cage, bay or silo.

Preferably the air separator means is located downstream of the screening means.

Optionally the air separator means is located upstream of one or more further material separation means.

Preferably the air separator means is attached to the support means directly or indirectly.

Preferably the material sorting apparatus comprises an intermediate conveyor.

Preferably the intermediate conveyor is an inclined conveyor.

Preferably the picking station conveyor is a horizontal conveyor.

Preferably the intermediate conveyor is located between the screening means and the material separation means.

Preferably the intermediate conveyor is located between the screening means and a manual picking station.

Preferably the intermediate conveyor is located between the outlet of the screening means and an inlet of a manual picking station.

Preferably the intermediate conveyor is adapted to transport material from the output of the screening means towards the manual picking station.

Preferably the intermediate conveyor is adapted to transport material not separated from the material stream by the air separator means.

Preferably the intermediate conveyor is located generally below the air separator means, in use.

Preferably the air separator means is adapted to generate a flow of air towards material in the material stream as said material falls out of the screening means towards the intermediate conveyor.

Preferably the at least one material separation means comprises at least one picking station.

Preferably the at least one picking station is a multi-bay picking station.

Preferably the at least one picking station is a two-bay picking station.

Optionally the at least one picking station is a four-bay, six-bay or eight-bay picking station.

Preferably the picking station comprises one or more picking positions for manual picking of one or more categories of items/material in the material stream. Preferably the picking station comprises a plurality of picking positions for manual picking of one or more categories of items/material in the material stream.

Preferably the picking station comprises a first picking position for manual picking of wooden items in the material stream.

Preferably the picking station comprises a second picking position for manual picking of plastic items in the material stream.

Preferably the or each picking station comprises a housing.

Preferably the housing comprises a roof.

Preferably the housing comprises one or more side walls.

Preferably the housing comprises one or more end walls.

Preferably the housing comprises a floor for supporting an operative.

Preferably the picking station comprises a personnel access door.

Preferably the personnel access door is located in one of the one or more side walls or end walls.

Preferably the personnel access door is accessible via a ladder, stairs or other suitable means.

Preferably the picking station comprises a material entrance for material to enter into the picking station.

Preferably the material entrance is located in an end wall of the housing.

Preferably the picking station comprises one or more material exits for material to exit out of the picking station.

Preferably the picking station comprises an unpicked material exit for unpicked material to pass out of the picking station.

Preferably the unpicked material exit is located in an end wall of the housing.

Preferably the unpicked material exit is located in the end wall of the housing which opposes that end wall in which the material entrance is located.

Preferably the picking station comprises one or more picked material exits for picked material to pass out of the picking station.

Preferably the picking station comprises one or more picked material exits for picked material to pass out of the picking station and into one or more storage means.

Preferably the picking station comprises at least two picked material exits for picked material to pass out of the picking station.

Preferably the or each picked material exit is located in an end wall or the floor of the housing.

Preferably the at least one picking station comprises a housing, a material entrance and an unpicked material exit, wherein the material entrance and the unpicked material exit are located in end walls of the housing.

Preferably the material entrance and the unpicked material exit are located in opposing end walls of the housing Preferably the or each picking station is attached to the support means.

Preferably the or each picking station is located on the support means.

Preferably the picking station comprises a picking station conveyor.

Preferably the picking station comprises a picking station conveyor, the picking station conveyor being at least partially located within the housing.

Preferably the picking station conveyor is arranged to carry material through the material entrance and through the unpicked material exit.

Preferably the picking station conveyor passes through the or each picking station.

Preferably the picking station conveyor is at least partially located within the housing.

Preferably the picking station conveyor is arranged to carry material through the material entrance.

Preferably the picking station conveyor is arranged to carry material towards the unpicked material exit.

Preferably the picking station conveyor is arranged to carry material through the unpicked material exit.

Preferably the picking station conveyor is arranged to carry material towards a terminal position.

Preferably a storage means is locatable beneath the terminal position, in use.

Preferably the picking station conveyor is arranged to carry material past the or each picking position.

Preferably the at least one material separation means comprises at least one magnetic separation means.

Preferably the magnetic separation means is located downstream from the manual picking station.

Preferably the magnetic separation means is located upstream from the terminal position.

Preferably the magnetic separation means is locatable above the picking station conveyor.

Preferably the magnetic separation means is located above the picking station conveyor, in use.

Preferably the magnetic separation means comprises a frame.

Preferably the frame is attached to the support means and/or to the manual picking station.

Preferably the frame is attached to the housing of the manual picking station.

Preferably the frame is attached to an end wall of the manual picking station.

Preferably the magnetic separation means is used to separate ferrous/magnetic material from the material stream.

Preferably magnetic/ferrous material is attracted towards the magnetic separation means, in use.

Preferably the magnetic separation means comprises a belt.

Preferably the belt is adapted to carry magnetic/ferrous material away from the picking station conveyor.

Preferably the magnetic separation means comprises a chute.

Preferably the belt is adapted to guide magnetic/ferrous material towards the chute.

Preferably the chute is adapted to guide magnetic/ferrous material towards a storage means.

Preferably the magnetic separation means is any type of magnetic separation means, such as a ferromagnetic separation means or an eddy current separator.

Preferably the or each material separation means is adapted for allowing at least one predetermined category of materials to be separated from a material stream.

Preferably the or each material separation means is adapted to separate at least one predetermined category of materials from materials not in said at least one predetermined category.

Preferably the material sorting apparatus comprises any combination of an optical sorting means, a near infrared sorting means, and/or a robotic sorting means.

Preferably the material sorting apparatus comprises at least one material separation means for separating fines from a material stream.

Preferably the material sorting apparatus comprises at least one material separation means for separating mid-size material from a material stream.

Preferably the material sorting apparatus comprises at least one material separation means for separating soil from a material stream.

Preferably the material sorting apparatus comprises at least one material separation means for separating low density material such as paper from a material stream.

Preferably the material sorting apparatus comprises at least one material separation means for separating wood and/or plastic and/or metal from a material stream.

Preferably the material sorting apparatus comprises at least one material separation means for separating ferrous metal from a material stream.

Preferably in use the material sorting apparatus is located on one or more storage means.

Preferably in use the material sorting apparatus is located on a plurality of storage means.

Preferably the or each storage means is adapted to store a category of materials separated from the material stream.

Preferably the or each storage means is adapted to store a single category of materials.

Preferably each storage means is adapted to store a different category of materials.

Preferably each storage means is configured for temporary storage of a category of materials.

Preferably the or each storage means comprises bays or silos.

Preferably the or each storage means comprises walls.

Preferably the or each storage means comprises cages.

Preferably the or each storage means comprises doors.

Preferably the or each storage means comprises nets.

Preferably the support means comprises a chassis.

Preferably the support means comprises a single chassis.

Preferably the support means comprises a single elongate chassis.

Preferably the chassis does not include wheels.

Preferably the support means comprises an upper side and a lower side.

Preferably the support means comprises an upper surface and a lower surface.

Preferably the upper surface is located on the upper side of the support means.

Preferably the lower surface is located on the lower side of the support means.

Preferably the upper surface/upper side of the support means is uppermost in use.

Preferably the lower surface/lower side of the support means is lowermost in use.

Preferably the upper surface/upper side is opposite the lower surface/lower side.

Preferably the material intake means and the at least one material separation means are located on an upper side or upper surface of the support means.

Preferably the material intake means, the screening means and the material separation means are mechanically coupled to the support means.

Preferably in use, the material intake means, the screening means and the material separation means are located on the upper side of the support means.

Preferably the material intake means and the or each material separation means are mechanically coupled to the support means on an upper side or upper surface of the support means.

Preferably the storage means are locatable on a lower side or lower surface of the support means.

Preferably the storage means are located on a lower side or lower surface of the support means in use.

Preferably one or more storage means are located below the material sorting apparatus.

Preferably one or more storage means are located below the material sorting apparatus, in use.

Preferably, in use, the support means is located between the storage means and the material intake means.

Preferably, in use, the support means is located between the storage means and the or each material separation means.

Preferably the or each material separation means is mechanically coupled to the support means.

Preferably one or more of the or each material separation means is mechanically coupled to the support means via suspension means such as one or more springs.

Optionally one or more of the or each material separation means is rigidly attached to the support means.

Preferably the support means comprises two substantially parallel elongate members.

Preferably the support means comprises one or more gaps, spaces or apertures for allowing material to pass through.

Preferably the support means comprises one or more apertures for allowing material to pass from the material separation means into the storage means.

Preferably the material sorting apparatus comprises one or more support legs.

Preferably the one or more support legs comprises one or more extendable support legs.

Preferably the one or more support legs comprises one or more hydraulic support legs.

Preferably the one or more support legs comprises one or more folding support legs.

Preferably in use the support legs extend between the support means and the ground.

Preferably the support legs are located on the lower side of the support means.

Preferably, in use, the support legs extend between the support means and the ground.

Preferably the direction of material through the material sorting apparatus is substantially parallel to the major axis of the material sorting apparatus.

Preferably the direction of material through the material sorting apparatus is substantially parallel to the longest dimension of the material sorting apparatus.

Preferably the direction of material through the material sorting apparatus is substantially parallel to the major axis of the support means.

Preferably the direction of material through the material sorting apparatus is substantially parallel to the longest dimension of the support means.

According to a second aspect of the invention there is provided a support means for supporting components of a material sorting apparatus in transportation and in use.

According to a third aspect of the invention there is provided a method of sorting materials in a material stream, the method comprising: providing a material sorting apparatus comprising a material intake means, at least one material separation means, and a support means; and sorting materials in a material stream using the material sorting apparatus.

According to a fourth aspect of the invention there is provided a method of sorting materials in a material stream, the method comprising: providing a material sorting apparatus; and sorting materials in a material stream using the material sorting apparatus.

Preferably the method further comprises transporting a material sorting apparatus to a site.

Preferably the method further comprises transporting a material sorting apparatus to a site in a single assembly.

Preferably the method further comprises locating the material sorting apparatus on one or more storage means.

Preferably the method further comprises locating the support means on one or more storage means.

Preferably the method further comprises locating the support means on one or more storage means such that the material sorting apparatus is located above the storage means.

Preferably the method comprises separating materials in the material stream using the at least one material separation means.

Preferably the method comprises separating materials in the material stream using at least one of a plurality of material separation means.

Preferably the method comprises separating fines, soil, wood, metal, plastic and/or ferrous/magnetic material from a material stream According to a further aspect of the invention there is provided a material sorting apparatus for sorting materials in a material stream, the material sorting apparatus comprising: a material intake means; at least one material separation means; and a support means for supporting the material sorting apparatus in transportation and in use. Advantageously, the use of a shared support means allows the components of the material sorting apparatus to be transported to site in a single operation, and removes the need to re-configure the apparatus for use when it reaches a site.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which show, by way of example only, two embodiments of an apparatus in accordance with the invention.

Figure 1:
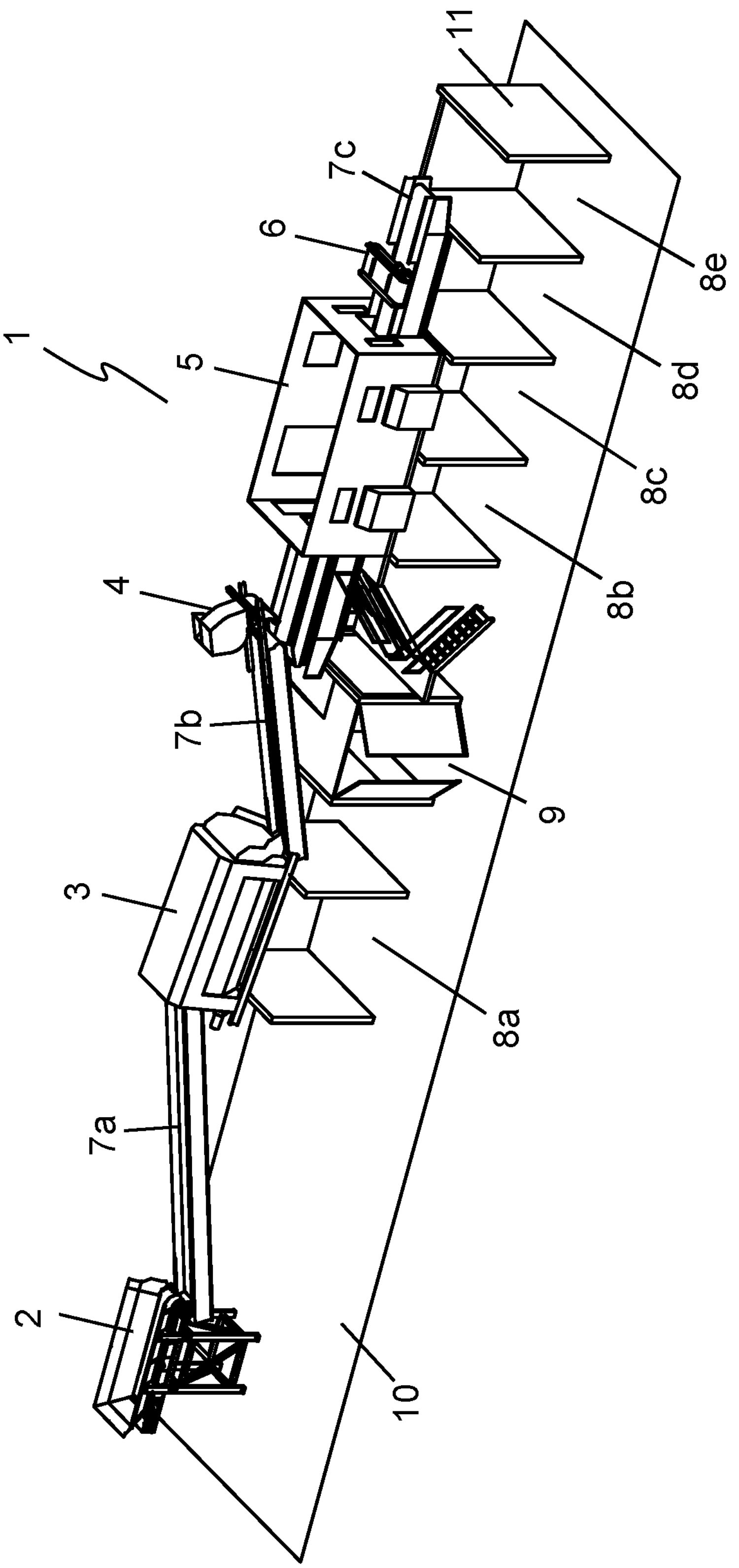
Figure 1 (PRIOR ART)
FIG. 1 is a perspective view of a prior art material sorting apparatus.

FIG. 1 shows a prior art material sorting apparatus generally indicated by the numeral 1. The prior art material sorting apparatus 1 includes a number of standalone material separation stations including feeder 2, trommel 3, air separator 4, picking station 5 and magnetic separator 6. The stations are connected by conveyors 7*a-c* which allow a material in a material stream to be transported through the material sorting apparatus 1 for sorting.

As will be appreciated, the prior art material sorting apparatus 1 has a large footprint and a number of standalone stations that need to be transported to a site 10 separately and connected together to be used. The feeder 2, trammel 3, air separator 4, picking station 5 and magnetic separator 8 must all be separately transported to a site 10, accurately spaced together and aligned with the conveyors 7*a-c*, storage arrangements 8*a-e*,9 and walls 11 to allow the material sorting apparatus 1 to function properly. This requires significant time and skill on the part of the installer, and therefore this type of prior art material sorting apparatus 1 is typically permanently installed within a waste sorting facility.

Figure 2:
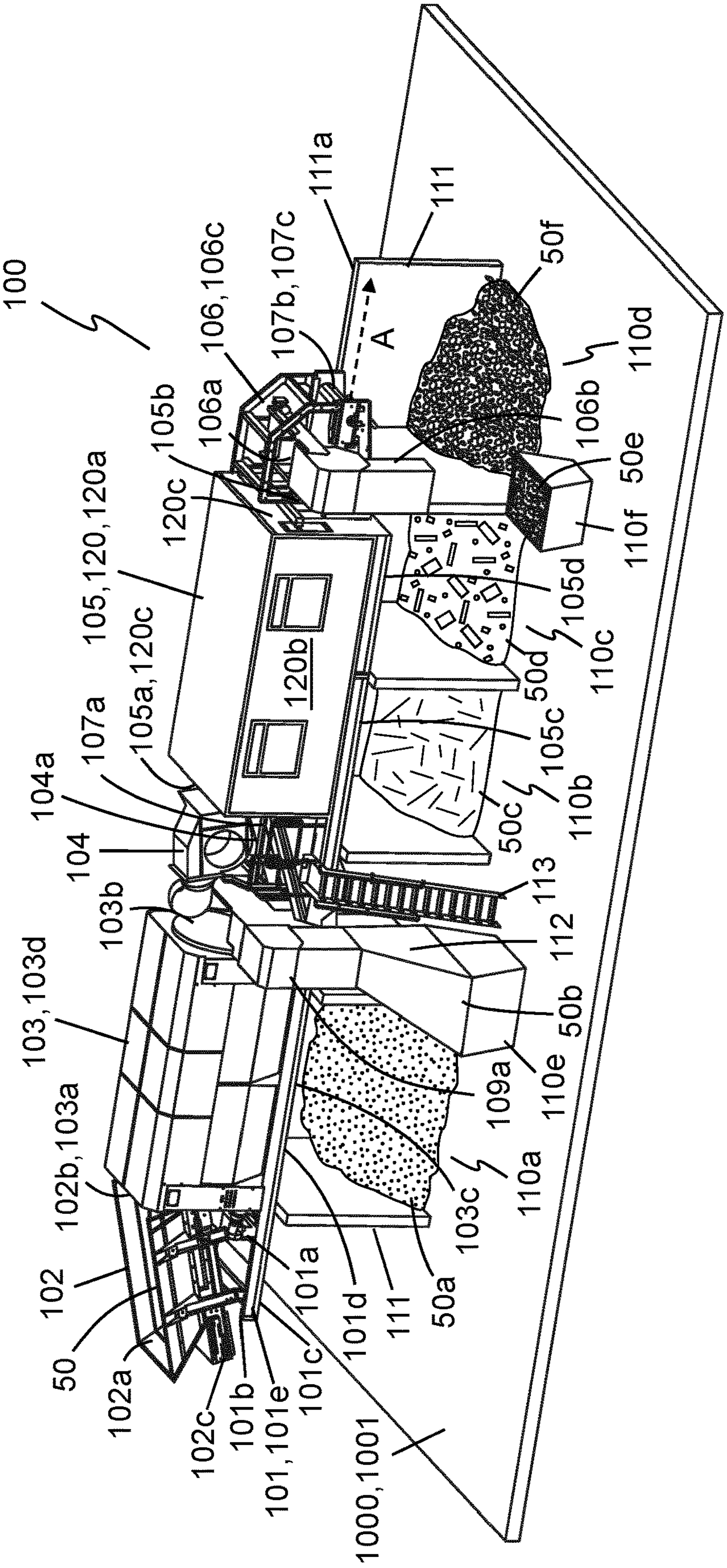
FIG. 2 is a perspective view of a material sorting apparatus according to a first embodiment of the invention.

In FIG. 2 there is shown a first embodiment of a material sorting apparatus according to the invention, generally indicated by the numeral 100. When deployed, the material sorting apparatus 100 is used to sort materials 50*a-f* in a material stream 50. The material sorting apparatus 100 comprises: a material intake arrangement 102; a plurality of material separation arrangements 103-106; a plurality of conveyors 102*c*,107*a*,107*b* for conveying material along paths within, around and/or proximal to the material sorting apparatus 100; and a support arrangement 101.

The support arrangement 101 is an elongate support arrangement 101. In the present example the support arrangement 101 is a unitary support arrangement 101. The support arrangement 101 is adapted to support the material sorting apparatus 100 during transport to site 1000 and also while it is being deployed, moved and/or used at a site 1000.

Each conveyor 102*c*,107*a*,107*b* is adapted to convey material towards, away from, between and/or within one or more of the material separation arrangements 103-106. In use, the material sorting apparatus 100 is located an and/or above one or more storage arrangements 110. In the example of FIG. 2, the material sorting apparatus is located on a plurality of walls 111 which form partially enclosed silos/storage bays 110*a*-110*d*. Particularly, the support arrangement 101 is located on the walls 111.

The material sorting apparatus 100 is optionally a waste sorting apparatus i.e. an apparatus for separating materials 50*a-f* in a waste stream 50. As will be appreciated, the present invention is not limited to waste sorting only and can be employed in many diverse situations where streams of mixed material are to be separated and sorted.

The material sorting apparatus 100 is semi-mobile in that it is transportable to and from a site 1000 via e.g. a crane or a heavy goods vehicle, truck or lorry. A crane can be coupled to the support arrangement 101 and then used to lift the material sorting apparatus 100 into place. The material sorting apparatus 100 can be easily manipulated since it is a standalone single piece and is not integral with or permanently attached to a vehicle such as a crane, heavy goods vehicle, truck or lorry. The material sorting apparatus 100 stays in place on a site 1000 because it does not include wheel arrangements such as wheels or integrally-formed wheel supports.

The material sorting apparatus 100 has a single configuration suitable for transport and use thereof. In other words, the material intake arrangement 102, at least one of the material separation stations 103-106, and the support arrangement 101 are consistently located with respect to each other during both transport and use of the material sorting apparatus 100. There being a single configuration means that the material sorting apparatus 100 can be configured off-site thereby reducing the complexity and set-up time during on-site deployment.

The material intake arrangement 102 comprises an entrance 102*a* for receiving material, for example mixed waste material from e.g. a building or domestic site, or any other material to be sorted. Material can be placed into the intake arrangement 102 via the entrance 102*a* using e.g. an excavator. The material intake arrangement 102 comprises an outlet arrangement 102*b* for allowing material placed into the intake arrangement 102 to move out of the material intake arrangement and towards the material separation arrangements 103-106. The outlet arrangement 102*b* is adapted to allow material to pass into the screening arrangement 103. The material intake arrangement 102 comprises an inclined feed conveyor 102*c*. The feed conveyor 102*c* is adapted to transport material in the material intake arrangement 102 towards the outlet arrangement 102*b* i.e. towards the exit of the material intake arrangement 102 and towards the screening arrangement 103.

The support arrangement 101 has an upper side 101*b* and a lower side 101*c*. The material intake arrangement 102 is mounted on the support arrangement 101, particularly on the upper side 101*b* of the support arrangement 101. The entrance 102*a*, the outlet arrangement 102*b* and the feed conveyor 102*c* are all located on a single side 101*b* of the support arrangement 101.

FIG. 2 shows that the material intake arrangement 102 is not located directly above a storage arrangement 110. The material intake arrangement 102 is rigidly attached or fixed to the support arrangement 101 via a mounting arrangement 101*a*. The mounting arrangement 101*a* comprises pillars 101*a* which are mechanically coupled or fixed to the material intake arrangement 102 and the support arrangement 101. The mechanical coupling/attachment is provided by attachment arrangements such as welded joints, springs and/or nuts and bolts.

The material sorting apparatus 100 comprises a trommel 103. The trommel 103 is located downstream from and proximally to the material intake arrangement 102, and upstream from the other material separation arrangements 104-106. As material passes out of the material intake arrangement 102, it passes into the trommel 103. The trommel 103 is adapted to separate undersized material or fines 50*a* from the material stream 50. The trommel 103 comprises a trommel entrance 103*a* through which material in the material stream can pass into the trommel 103. The trommel 103 comprises a primary outlet 103*c* for undersized material 50*a*. The undersized material 50*a* can be soil and/or fines and/or any other sized material that the trommel 103 is adapted to separate.

The primary outlet 103*c* is located underneath the trommel 103 in the view of FIG. 2, i.e. adjacent to the interface between the support arrangement 101 and the trommel 103. In use, undersized material 50*a* can pass through the primary outlet 103*c* and into a storage silo/bay 110*a* via a suitable aperture 101*d* in the support arrangement 101. The trommel 103 comprises a secondary outlet 103*b* for the remaining material stream 50 i.e. the material stream 50 after fines/soil/undersized particles/mid-sized particles have been removed. In optional embodiments the trammel 103 is adapted to separate multiple sizes of material from the material stream 50. In use, material is able to pass out of the trammel 103 via the secondary outlet 103*b*.

The trammel 103 comprises a housing 103*d*. The trammel 103, particularly the housing 103*d* thereof, is mounted directly on the support arrangement 101 on an upper side 101*b* of the support arrangement 101 via a mechanical coupling such as nuts and bolts, a suspension arrangement and/or welding. Inside the housing 103*d* there is located a rotating mesh through which small particles such as fines, soil, mid-sized material and/or undersized material can pass.

The material sorting apparatus 100 comprises an air separator 104. The air separator 104 comprises an air-flow generator in the form of a fan or blower 104. The air separator 104 is adapted to generate a flow of air proximally to the secondary outlet 103*b* of the trammel 103, towards material in the material stream as it falls out of the trammel 103 and onto inclined conveyor 107*a*.

The air separator 104 is adapted to separate low density/lighter material 50*b* from other materials in the material stream by providing a flow of air which directs such material towards a storage arrangement 110*e* via a chute 109*a*. The storage arrangement 110*e* is a skip and the gap between the chute 109*a* and the skip 110*e* is surrounded by a net 112 to stop the lighter material 50*b* from blowing away. The storage arrangement 110*e* may be a cage, bay or silo. As can be seen from FIG. 2, the air separator 104 is located downstream of the trammel 103 and upstream of the further material separation arrangements 105, 106. In this embodiment the air separator 104 is mechanically coupled to the support arrangement 101 indirectly via a frame 104*a*.

The material sorting apparatus 100 comprises an inclined conveyor 107*a* located between the trammel 103 and a manual picking station 105. The intermediate conveyor 107*a* is located 23 between the outlet 103*b* of the trammel 103 and an inlet 105*a* of the manual picking station 105 and is adapted to transport material from the output of the trammel 103 towards the manual picking station 105. The conveyor 107*a* is adapted to transport material not separated from the material stream by the air separator 104. The conveyor 107*a* is located generally below the air separator 104. The air separator 104 is adapted to generate a flow of air in a direction which is generally perpendicular to the major axis A and longest dimension of the material sorting apparatus 100.

The material sorting apparatus 100 comprises a manual picking station 105. The picking station 105 is a multi bay picking station, particularly a two-bay picking station located above storage bays 110*b* and 110*c*, in use. Inside the picking station 105 is one or more picking positions for manual picking of items in the material stream 50. The picking station 105 comprises a first picking position for manual picking of e.g. wooden items 50*c* in the material stream 50 and a second picking position for manual picking of e.g. plastic items 50*d* in the material stream 50. Operatives inside the picking station 105 can pick predetermined categories of items from a conveyor 107*b* which runs through the picking station 105, and deposit said picked items into the storage bays 110*b* and 110*c* through holes, chutes or apertures 105*c*,105*d* in the floor or walls of the picking station 105.

The picking station 105 comprises a housing 120 which is located oi, and mechanically coupled to, the support arrangement 101, particularly the upper side 101*b* of the support arrangement 101. The housing 120 comprises a roof 120*a*, two side walls 120*b*, two end walls 120*c* and a floor for supporting operatives stood next to the conveyor 107*b* at the picking positions. Operatives can enter the manual picking station 105 through a personnel access door located in one of the side or end walls. The personnel access door is accessible from the ground 1001 via a ladder 113 or in other embodiments a set of stairs or other means.

The picking station 105 comprises a material entrance 105*a* through which material can enter the picking station 105. The material entrance 105*a* is located in an end wall 120*c* of the housing 120. The picking station 105 comprises an unpicked material exit 105*b* through which unpicked material in the material stream can exit the picking station 105. The unpicked material exit 105*b* is located in an end wall 120*c* of the housing 120, particularly the end wall opposing that end wall in which the material entrance 105*a* is located. The picking station 105 comprises two sorted material exits 105*c* and 105*d* through which picked material (in this example, wood and plastic) can pass out of the picking station 105 and into the storage bays 110*b*. 110*c*. Each sorted material exit 105*c*, 105*d* is located in a side wall 120*b* or the floor of the housing 120.

The picking station 105 comprises a picking station conveyor 107*b* which passes through the picking station housing 120 from the material entrance 105*a* to the unpicked material exit 105*b*. The picking station conveyor 107*b* passes each picking position and is arranged to carry material out through the unpicked material exit 105*b* towards a terminal position 107*c*. A storage bay 110*d* is located beneath the terminal position 107*c*, in use, so that any material 50*f* which has not been separated from the material stream 50 falls into the storage bay 110*d*.

The material sorting apparatus 100 comprises a magnetic separator 106. The magnetic separator 106 is used to separate ferrous/magnetic material 50*e* from other material in the material stream 50. The magnetic separator 106 is located downstream from the manual picking station 105, upstream from the terminal position 107*c* of the picking station conveyor 107*b* and above the picking station conveyor 107*b*. The magnetic separator 106 comprises a frame 106*c* which is attached to the support arrangement 101 via attachment to an end wall 120*c* of the housing 120 of the manual picking station 105.

In use, magnetic/ferrous material 50*e* in the material stream, travelling on the conveyor 107*b*, is attracted towards the magnetic separator 106, which in this example is a ferromagnetic separator. The magnetic separator 106 comprises a rotating belt 106*a* which is adapted to carry magnetic/ferrous material away from the picking station conveyor 107*b* and towards chute 106*b*. The chute 106*b* is adapted to guide magnetic/ferrous material 50e towards a storage arrangement 110f. The storage arrangement 110f is a skip located underneath the outlet of the chute 106b.

Each material separation arrangement 103-106 is adapted for allowing at least one predetermined category of materials to be separated from the material stream 50. The material stream travels from the intake arrangement 102 towards the terminal position 107c. Upstream erections are towards the intake arrangement 102 and downstream directions are towards the terminal position 107c of the picking station conveyor 107b. In use, each material separation arrangement 103-106 is located generally above the storage arrangements 1108-f. Each storage arrangement 110 is adapted to store a different category of materials separated from the material stream 50, for further processing.

In the preferred embodiment the support arrangement 101 comprises a single elongate non-wheeled chassis 101 which is locatable on, above and/or adjacent to one or more storage arrangements 110 in use such that sorted material is able to pass out of the material sorting apparatus 100 and into the one or more storage arrangements 110.

The support arrangement 101 comprises an upper side 101b proximal to an upper surface, and a lower side 101c proximal to a lower surface. During operation, the upper surface is uppermost i.e. furthest away from the ground 1001. The material intake arrangement 102 and the material separation arrangements 103-106 are all located on the upper side 101b of the support arrangement 101. In other words, in use, the material intake arrangement 102 and the material separation arrangements 103-106 are all located above the support arrangement 101. The material intake arrangement 102 and each material separation arrangement 103-106 are mechanically coupled to the support arrangement 101. In use, the storage arrangements 110 are located generally below the support arrangement 101.

The support arrangement 101 comprises two substantially parallel elongate members 101e, connected together via cross members. The support arrangement 101 comprises a plurality of gaps, spaces or apertures 101d for allowing material to pass from the material separation arrangements 103 and 105, through the support arrangement 101 and into the storage arrangements 110a-110d under the force of gravity.

The operation of the material sorting apparatus 100 is as follows. The material sorting apparatus 100 is transported to a site 1000 where the walls 111 forming the storage bays 110a-d are already assembled. As will be appreciated, the material sorting apparatus 100 is transported to a site 1000 in a single assembly meaning that it does not have to be assembled or significantly re-configured on site 1000. This saves significant time. The material sorting apparatus 100 may be transported to a site 1000 using e.g. a lorry or other vehicle.

Once the material sorting apparatus 100 has reached site 1000, the material sorting apparatus 100 is lifted and placed onto the walls 111 such that the support arrangement 101 is located directly on the walls 111. The material sorting apparatus 100 may be lifted from a lorry and placed on the walls 111 using a crane, for example. The material sorting apparatus 100 is placed on the walls such that the support arrangement 111 makes contact with the walls 111. In use, the support arrangement 101 rests on the walls 111, particularly the top or uppermost surface 111a of the walls 111. The apertures/holes 101d for allowing sorted materials to pass out of the material separation arrangements 103-106 and through the support arrangement 101 are aligned with the storage bays 110a-d. Storage arrangements 110e and 110f are located beneath the respective chutes 109a,106b.

Once the material sorting apparatus 100 has been suitably arranged on the walls 111 and storage arrangements 110 have been suitably located beneath the respective chutes 109a,106b, the material sorting apparatus 100 can be used to sort material in a material stream 50. In use, material is input into the input arrangement 102 using e.g. a grabber or excavator arm. Inputted material is passed along the material sorting apparatus 100 through the trommel 103, the air separator 104, the manual picking station 105, and past the magnetic separator arrangement 106 for sorting.

In use, certain items of material will be removed from the material stream 50. A first category of material (e.g. soil/fines 50a) is removed by the trommel 103, a second category of material (e.g. low density/lights material 50b such as paper) is removed by the air separator 104, a third category of material (e.g. wooden items 50c) and a fourth category of material (e.g. plastic items 50d) are removed within the manual picking station 105, and a fifth category of material (e.g. magnetic/ferrous material 50e) is removed by the magnetic separator arrangement 106. Items that are removed/separated out from the material stream are placed in respective storage arrangements 110. Any remaining material 50f that has not been removed/separated out from the material stream (e.g. oversize material) will pass over the end 107c of the picking station conveyor 107b and will fall off the end of the conveyor 107b to be collected in storage arrangement 110d.

The direction of the material stream 50 through the material sorting apparatus 100 is substantially parallel to the major axis A of the material sorting apparatus 100. In the disclosed embodiments, the major axis A of the material sorting apparatus 100 is substantially parallel to the longest dimension of the material sorting apparatus 100 and the longest dimension of the support arrangement 101. The support arrangement 101 is elongate and extends along the major axis A of the material sorting apparatus 100. Configuring the material sorting apparatus 100 so that the direction of the material stream 50 through the material sorting apparatus 100 is along a substantially straight line results in a more compact system which is more easily transportable when compared with prior art systems.

Once material in the material stream 50 has been sorted and all of the material in the material stream has been separated into respective storage arrangements 110, the sorted material can be removed from the storage arrangements 110 and taken for further processing.

When sorting operations have been completed on site 1000 the material sorting apparatus 100 can be removed from the site 1000. The material sorting apparatus 100 can be lifted off the walls 111 by e.g. a crane and placed onto the back of a lorry or trailer for transport to another site. As will be appreciated, little or no reconfiguring of the apparatus 100 is required in order to remove the apparatus 100 from a site.

Figure 3:
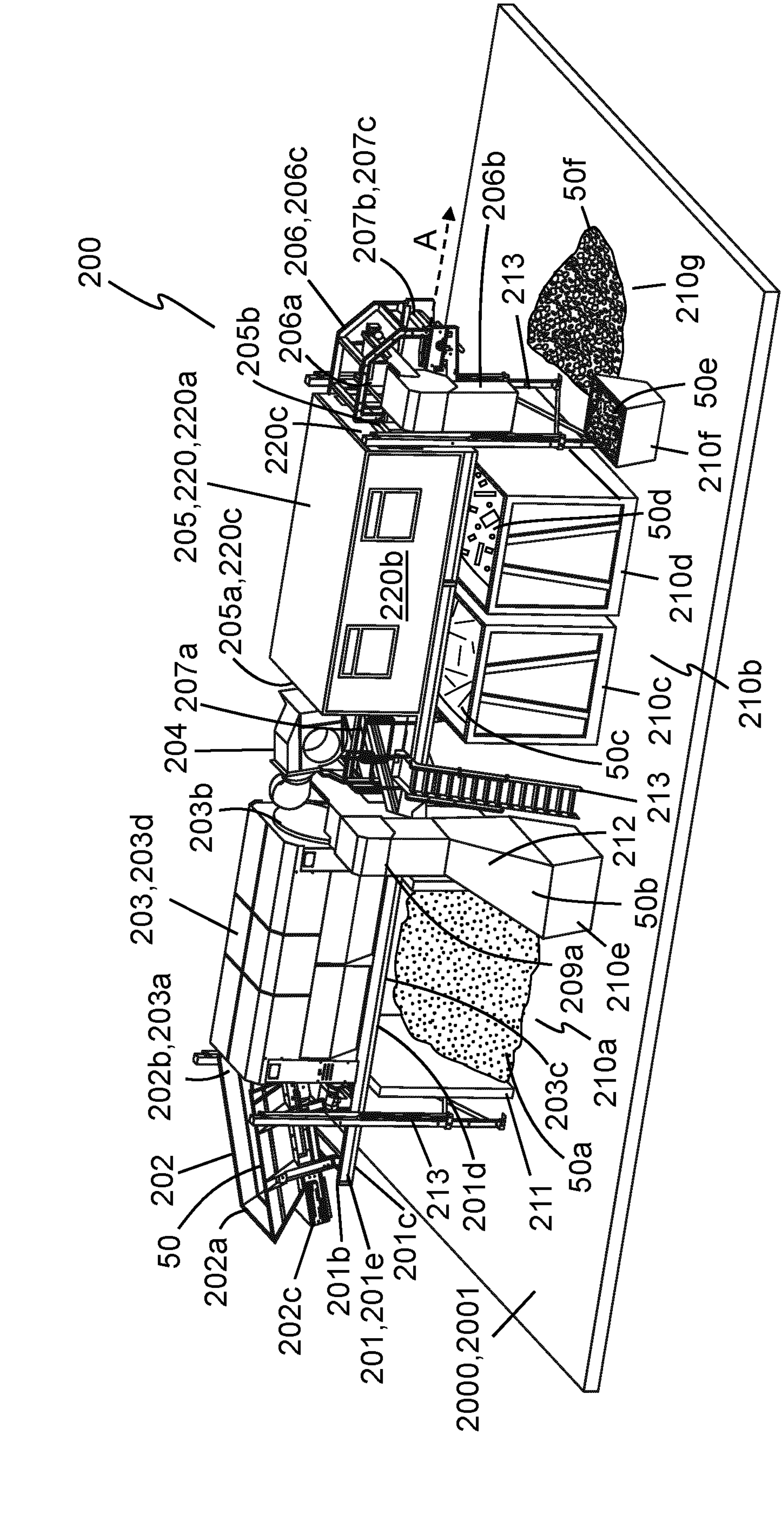
FIG. 3 is a perspective view of a material sorting apparatus according to a second embodiment of the invention.

In FIG. 3 there is shown a second embodiment of a material sorting apparatus according to the invention, generally indicated by the numeral 200. When deployed, the material sorting apparatus 200 is used to sort materials in a material stream 50. The material soiling apparatus 200 is similar to the previous embodiment 100, with similar numerals denoting similar features, and can be used in a similar way to the previous embodiment.

The material sorting apparatus 200 comprises: a material intake arrangement 202 (similar to the material intake arrangement of the first embodiment 102); a plurality of material separation arrangements 203-206 (similar to the material separation arrangements of the first embodiment 103-106, respectively); a plurality of conveyors 202*c*,207*a*, 207*b* (similar to the conveyors of the first embodiment 102*c*,107*a*,107*b*) for conveying material along paths within, around and/or proximal to the material sorting apparatus 200; and a support arrangement 201 (similar to the support arrangement of the first embodiment 101). The support arrangement 201 is an elongate support arrangement 201. In the present example the support arrangement 201 is a unitary support arrangement 201.

The support arrangement 201 is adapted to support the material sorting apparatus 200 during transport to site 2000 and also while it is being deployed, moved and/or used at a site. In the preferred embodiment the support arrangement 201 comprises a single elongate non-wheeled chassis 201 which is locatable on, above and/or adjacent to one or more storage arrangements 210 in use such that sorted material is able to pass out of the material sorting apparatus 200 and into the one or more storage arrangements 210.

The support arrangement 201 comprises an upper side 201*b* proximal to an upper surface, and a lower side 201*c* proximal to a lower surface. During operation, the upper surface is uppermost i.e. furthest away from the ground 2001. The material intake arrangement 202 and the material separation arrangements 203-206 are all located on the upper side 201*b* of the support arrangement 201. In other words, in use, the material intake arrangement 202 and the material separation arrangements 203-206 are all located above the support arrangement 201. The material intake arrangement 202 and each material separation arrangement 203-206 are mechanically coupled to the support arrangement 201. In use, the storage arrangements 210 are located generally below the support arrangement 201.

The support arrangement 201 comprises two substantially parallel elongate members 201*e*, connected together via cross members. The support arrangement 201 comprises a plurality of gaps, spaces or apertures 201*d* for allowing material to pass from the material separation arrangements 203 and 205, through the support arrangement 201 and into the storage arrangements 210*a*-210*d* under the force of gravity.

The material sorting apparatus 200 comprises a plurality of conveyors 207, each conveyor 207 being adapted to convey material between and/or within one or more of the material separation arrangements 203-206.

The material sorting apparatus 200 comprises one or more extendable support legs 213 which, in use, extend between the support arrangement 201 and the ground 2001. In this example the material sorting apparatus 200 comprises four support legs 213, which may be hydraulically powered. The support legs 213 are attached to the support arrangement 201 towards the distal ends of the support arrangement 201.

In use, the material sorting apparatus 200 is located above and/or adjacent to the one or more storage arrangements 210. In the example of FIG. 3, the material sorting apparatus 200 is located above a plurality of walls 211 which form partially enclosed silos/storage bays 210*a* and 210*b*. Particularly, the support arrangement 201 is located above and/or adjacent to the walls 211 whilst being supported by the support legs 213. Two removable storage containers 210*c*,210*d* are located in bay 210*b* beneath the manual picking station 205. As will be appreciated any number of bays and/or storage containers can be located in this region, as appropriate.

The material sorting apparatus 200 is optionally a waste sorting apparatus i.e. an apparatus for separating materials in a waste stream 50. As will be appreciated, the present invention is not limited to waste sorting only and can be employed in many diverse situations where streams of mixed material are to be separated and sorted.

The material sorting apparatus 200 is semi-mobile in that it is transportable to and from a site 2000 via e.g. a crane or a heavy goods vehicle, truck or lorry. A crane can be coupled to the support arrangement 201 and then used to lift the material sorting apparatus 200 into place. The material sorting apparatus 200 can be easily manipulated since it is a standalone single piece and is not integral with or permanently attached to a vehicle such as a crane, heavy goods vehicle, truck or lorry. The material sorting apparatus 200 stays in place because it does not include wheel arrangements such as wheels or integrally-formed wheel supports.

The material sorting apparatus 200 has a single configuration suitable for transport and use thereof. In other words, the material intake arrangement 202, at least one of the material separation stations 203-206, and the support arrangement 201 are consistently located with respect to each other during both transport and use of the material sorting apparatus 200. There being a single configuration means that the material sorting apparatus 200 can be configured off-site thereby reducing the complexity and set-up time during on-site deployment. Only the support legs 213 need to be deployed and/or configured at site 2000. The support legs 213 may be removable and/or stowable for transport.

The operation of the material sorting apparatus 200 is as follows. The material sorting apparatus 200 is transported to a site 2000 where material is to be sorted. As will be appreciated, the material sorting apparatus 200 is transported to a site 2000 in a single assembly meaning that it does not have to be assembled or significantly re-configured on site, saving significant time.

Once the material sorting apparatus 200 has reached site 2000, the material sorting apparatus 200 is lifted and the support legs 213 are deployed such that the walls partially enclosed silos/storage bays 210*a* and 210*b* are locatable underneath and/or adjacent to the material sorting apparatus 200. The support legs 213, which extend to the ground 2001, are able to fully support the material sorting apparatus 200, although walls and or/storage containers may be used to offer added support. The apertures/holes 201*d* for allowing sorted materials to pass out of the material separation arrangements 203-206 and through the support arrangement 201 are aligned with the storage bays 210*a-b*. Storage arrangements 210*c*-210*f* are located beneath the respective chutes and the manual picking station 205.

Once the material sorting apparatus 200 has been located at site 2000, the support legs 213 have been deployed and the storage arrangements 210*c-f* have been located suitably under the outputs of the sorting arrangements, the material sorting apparatus 200 may be used to sort material in a material stream 50. Material is input into the input arrangement 202 and passed along the material sorting apparatus 200 through the trommel 203, the air separator 204, the manual picking station 205, and past the magnetic separator arrangement 206 for sorting.

In use, certain items of material will be removed from the material stream. A first category of material (e.g. soil/fines 50*a*) is removed by the trommel 203, a second category of material (e.g. low density/lights material 50*b* such as paper) is removed by the air separator 204, a third category of material (e.g. wooden items 50*c*) and a fourth category of material (e.g. plastic items 50*d*) is removed within the manual picking station 205, and a fifth category of material (e.g. magnetic/ferrous material 50*e*) is removed by the magnetic separator arrangement 206. Items that are removed/separated out from the material stream are placed in respective storage arrangements 210. Any remaining material 50*f* that has not been removed/separated out from the material stream 50 (e.g. oversize material) will pass over the end 207*c* of the picking station conveyor 207*b* and will fall off the end of the conveyor 207*b* to be collected in e.g. a storage arrangement such as a storage area 210*g*.

The direction of the material stream 50 through the material sorting apparatus 200 is substantially parallel to the major axis A of the material sorting apparatus 200. In the disclosed embodiments, the major axis A of the material sorting apparatus 200 is substantially parallel to the longest dimension of the material sorting apparatus 200 and the longest dimension of the support arrangement 201. The support arrangement 201 is elongate and extends along the major axis A of the material sorting apparatus 200. Configuring the material sorting apparatus 200 so that the direction of the material stream through the material sorting apparatus 200 is along a substantially straight line results in a more compact system which is more easily transportable when compared with prior art systems.

Once material in the material stream 50 has been sorted and all of the material in the material stream 50 has been separated into respective storage arrangements 210, the sorted material can be removed from the storage arrangements 210 and taken for further processing.

When sorting operations have been completed on a site 2000 the material sorting apparatus 200 can be removed from the site 2000. The material sorting apparatus 200 can be lifted by e.g. a crane and the support legs 213 are retracted, removed and/or stowed for transport, as appropriate. The material sorting apparatus 200 is placed onto the back of a lorry or trailer for transport to another site. As will be appreciated, little or no reconfiguring of the apparatus 200 is required in order to remove the apparatus 200 from a site.

As will be understood by the skilled person, the example embodiments presented above can be modified in a number of ways without departing from the scope of the invention. For example, the material separation stations 103-106 and 203-206 can be arranged in any order most suited to the particular application. An important benefit of the apparatus lies in the fact that the material sorting apparatus is widely adaptable—while the apparatus includes all of the essential components required in the most common sorting situations, more components can be added as necessary. Wheels and/or tracks may be attached to the apparatus 100,200, for example the support arrangement 101,201. Support legs 213 can be used with either embodiment.

The material sorting apparatus 100,200 may include a native source of electrical power, such as a generator, or be connectable to a source of electrical power, for powering one or more components thereof e.g. the conveyors, trommel, air separator or magnetic separator.

The material sorting arrangement 100,200 may include a screen such as a multi screen having multiple screens of different sizes instead of, or in addition to, the trommel 103,203. Any suitable air separator means 104,204 may be used, such as a cyclonic separator and/or an air flow generation means in the form of a vacuum source for sucking material. In alternatives the magnetic separation arrangement 106,206 may include use any other type of magnetic separator, such as an eddy current separator. The material sorting apparatus 100,200 may include any combination of an optical sorting means, a near infrared sorting means, and/or a robotic sorting means such as a robotic arm.

The manual picking station 105,205 may be of any suitable length and may have any suitable number of picking positions, chutes and sorted material exits. The picking station 105,205 may be a four-bay, six-bay or eight-bay picking station.

The material sorting apparatus 100,200 may include support legs in the form of hydraulically-powered support legs. The hydraulically-powered support legs may be attached to the support arrangement 101,201 and may be used to lift the apparatus 100,200 during installation at a site 1000,2000. For example, hydraulically-powered support legs may be used to lift the material sorting apparatus 100,200 clear from a lorry or trailer, and may lift the material sorting apparatus 100,200 to a suitable height such that storage arrangements 110,210 can be placed underneath the material sorting apparatus 100,200.

The material sorting apparatus 100,200 may additionally or alternatively include folding support legs at one end of the material sorting arrangement 100,200, for example beneath the material intake arrangement 102,202. The folding support legs may be pivotably attached to the support arrangement 101,201 at one end thereof. The folding support legs may be movable between a transport position in which the folding support legs are adjacent and parallel to the support arrangement 101,201, and a deployed position in which the folding support legs are perpendicular to the support arrangement 101,201. In the deployed position one end of each folding support leg will be in contact with the ground 1001,2001 and the other end will be in contact with the support arrangement 101,201.

The material sorting apparatus 100,200 may rest on walls 111, for example masonry walls or metal frames. The walls 111 may be temporary or permanent.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

The invention claimed is:

1. A material sorting apparatus for sorting materials in a material stream, the material sorting apparatus comprising: a material intake means for receiving material that is input to the material sorting apparatus; at least one screening means located downstream of the material intake means; at least one material separation means located downstream of the material intake means; at least one conveyor means for conveying material along a path within, around and/or proximal to the material sorting apparatus; an elongate support means adapted for supporting the material intake means, the at least one screening means, the at least one material separation means and the at least one conveyor means, the elongate support means comprising a single elongate non-motive chassis; and one or more extendable support legs; wherein the at least one material separation means comprises at least one picking station and wherein the at least one picking station comprises a housing, a material entrance and an unpicked material exit, wherein the material entrance and the unpicked material exit are located in end walls of the housing.

2. The material sorting apparatus as claimed in claim 1 wherein the material sorting apparatus does not include wheel arrangements such as wheels or integrally-formed wheel supports.

3. The material sorting apparatus as claimed in claim 1 wherein the material intake means, the screening means and the material separation means are mechanically coupled to the support means.

4. The material sorting apparatus as claimed in claim 3 wherein, in use, the material intake means, the screening means and the material separation means are located on the upper side of the support means.

5. The material sorting apparatus as claimed in claim 1 wherein the material sorting apparatus is located on and/or, above one or more storage means.

6. The material sorting apparatus as claimed in claim 5 wherein one or more storage means are located below the material sorting apparatus.

7. The material sorting apparatus as claimed in claim 5 wherein the one or more storage means comprises one or more silos formed by one or more walls.

8. The material sorting apparatus as claimed in claim 7 wherein the support means is located on the one or more walls.

9. The material sorting apparatus as claimed in claim 1 wherein the screening means comprises a trommel.

10. The material sorting apparatus as claimed in claim 9 wherein the trommel is adapted to separate multiple sizes of material from the material stream.

11. The material sorting apparatus as claimed in claim 1 wherein the screening means is mechanically coupled to an upper side of the support means via suspension means such as one or more springs.

12. The material sorting apparatus as claimed in claim 1 wherein the at least one material separation means comprises at least one air separator means.

13. The material sorting apparatus as claimed in claim 12 wherein the material sorting apparatus comprises an intermediate conveyor.

14. The material sorting apparatus as claimed in claim 1 wherein the at least one picking station is a multi-bay picking station.

15. The material sorting apparatus as claimed in claim 1 wherein the picking station comprises a picking station conveyor, the picking station conveyor being at least partially located within the housing.

16. The material sorting apparatus as claimed in claim 1 wherein the at least one material separation means comprises at least one magnetic separation means.

17. The material sorting apparatus as claimed in claim 16 wherein the at least one magnetic separation means is located above the picking station conveyor, in use.

18. A method of sorting materials in a material stream, the method comprising: providing a material sorting apparatus according to claim 1; and sorting materials in a material stream using the material sorting apparatus.

* * * * *